United States Patent
Raymond et al.

(10) Patent No.: US 10,693,704 B2
(45) Date of Patent: Jun. 23, 2020

(54) DYNAMIC ALLOCATION OF SERVICE COMPONENTS OF INFORMATION SERVICE IN HIERARCHICAL TELECOMMUNICATION ARCHITECTURE

(71) Applicant: B.yond, Inc., Frisco, TX (US)

(72) Inventors: Paul-Andre Raymond, Reston, VA (US); Izzet Murat Bilgic, Woodinville, WA (US)

(73) Assignee: B.yond, Inc., Frisco, TX (US)

( * ) Notice: Subject to any disclaimer, the term of this patent is extended or adjusted under 35 U.S.C. 154(b) by 114 days.

(21) Appl. No.: 15/922,817

(22) Filed: Mar. 15, 2018

(65) Prior Publication Data

US 2018/0331885 A1 Nov. 15, 2018

Related U.S. Application Data

(60) Provisional application No. 62/504,491, filed on May 10, 2017.

(51) Int. Cl.

| | |
|---|---|
| *G06F 15/173* | (2006.01) |
| *H04L 12/24* | (2006.01) |
| *H04L 12/869* | (2013.01) |
| *H04L 12/917* | (2013.01) |
| *H04L 12/911* | (2013.01) |
| *H04L 12/927* | (2013.01) |
| *H04B 7/022* | (2017.01) |
| *H04L 12/715* | (2013.01) |
| *H04L 12/66* | (2006.01) |

(52) U.S. Cl.
CPC ........ *H04L 41/044* (2013.01); *H04L 41/0816* (2013.01); *H04L 47/60* (2013.01); *H04L 47/76* (2013.01); *H04L 47/782* (2013.01); *H04L 47/805* (2013.01); *H04B 7/022* (2013.01); *H04L 12/66* (2013.01); *H04L 45/04* (2013.01)

(58) Field of Classification Search
USPC .................................. 709/223, 226, 213, 212
See application file for complete search history.

(56) References Cited

U.S. PATENT DOCUMENTS

| | | | | |
|---|---|---|---|---|
| 9,998,399 | B2* | 6/2018 | Dunbar | H04L 67/1008 |
| 2017/0220389 | A1* | 8/2017 | Michael | G06F 9/5027 |
| 2018/0026910 | A1* | 1/2018 | Balle | G06F 3/0613 |
| | | | | 709/226 |
| 2018/0027060 | A1* | 1/2018 | Metsch | G06F 3/0613 |
| | | | | 709/226 |

* cited by examiner

*Primary Examiner* — Lan Dai T Truong
(74) *Attorney, Agent, or Firm* — Fenwick & West LLP

(57) ABSTRACT

Embodiments relate to allocating resources of computing devices for providing information service in a network. The computing devices may be hierarchically structured and may include, for instance, cloud servers, telecommunication servers, edge edges, gateways, and client devices. A system environment may include a hierarchical orchestrator coordinating with one or more local orchestrators to allocate service components (for example, a discrete functional software or hardware component) to computing devices. The orchestrators can automatically reallocate resources responsive to detecting update events such as a change in traffic or payload on the network.

16 Claims, 12 Drawing Sheets

1000

Determine allocation of service components to a first set of computing devices that are hierarchically structured
1010

Send first instructions causing the first set of computing devices to deploy and execute service components
1020

Detect an update event
1030

Automatically update the allocation of the service components to a second set of computing devices that are hierarchically structured
1040

Send second instructions causing the second set of computing devices to deploy and execute service components
1050

FIG. 10

DYNAMIC ALLOCATION OF SERVICE COMPONENTS OF INFORMATION SERVICE IN HIERARCHICAL TELECOMMUNICATION ARCHITECTURE

CROSS-REFERENCE TO RELATED APPLICATION

This application claims priority under 35 U.S.C. § 119(e) to U.S. Provisional Patent Application Ser. No. 62/504,491 filed on May 10, 2017, which is incorporated by reference herein in its entirety.

BACKGROUND

This disclosure relates generally to a hierarchical architecture of computing devices for cloud computing and specifically relates to providing information service through the hierarchical architecture.

Virtualization and cloud computing have enabled information services to be dissociated from specific computing devices and physical hardware. For example, a service for a client device may be assigned to a given server of a large data center, and the server may execute multiple services. These large data centers are referred to as the "cloud," and cloud resources are provided by cloud service providers to third parties.

However, existing cloud data centers have limitations and are not organized to ensure low latency, high reliability, and compatibility with services in certain use cases with unideal conditions. For instance, if a particular data center server is experiencing a high workload and traffic of service requests, the latency of the data center server will increase, and thus result in low quality performance. It is challenging to manage the various types of computing devices in a cloud network and to effectively distribute service components among the computing devices while maintaining satisfactory performance and reliability.

SUMMARY

Embodiments relate to providing information service in a network including hierarchically structured computing devices. In an embodiment, a method includes determining allocation of service components of an information service to resources of a first set of computing devices. The method further includes sending first instructions causing the first set of computing devices to deploy and execute service components allocated to the first set of computing devices to provide the information service. The method further includes detecting an update event after deploying the service components to the first set of computing devices according to the first instructions. The method further includes automatically updating the allocation of the service components to resources of a second set of computing devices that are hierarchically structured, responsive to detecting the update event. The method further includes sending second instructions causing the second set of computing devices to deploy and execute service components allocated to each of the second set of computing devices to provide the information service.

BRIEF DESCRIPTION OF THE DRAWINGS

FIG. 10 is a flow chart illustrating a process for allocating service components to computing devices that are hierarchically structured, according to one embodiment.

Figure 1:
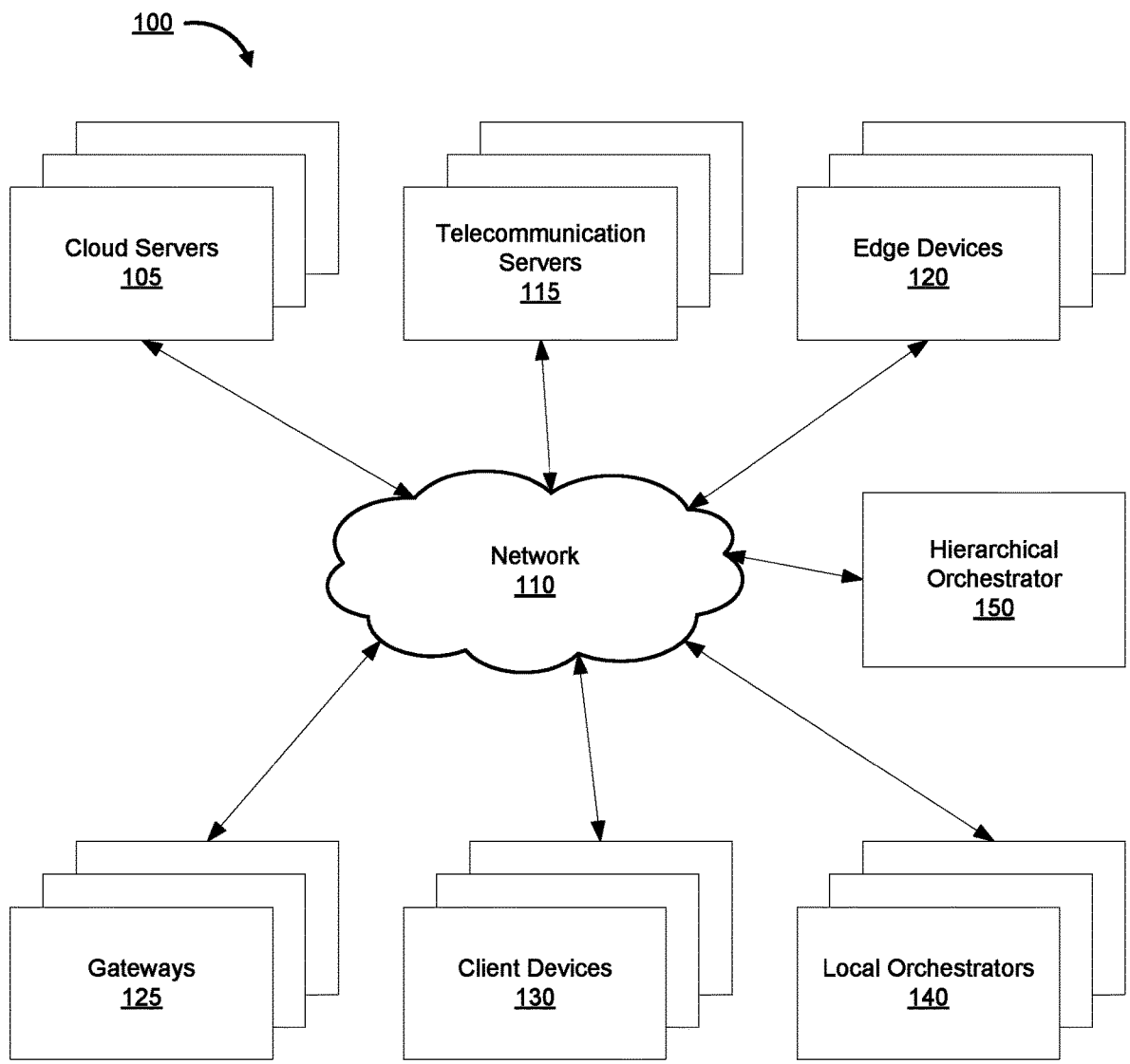
FIG. 1 is a diagram of a telecommunication system for providing information services, according to one embodiment.

The figures depict embodiments of the present disclosure for purposes of illustration only.

DETAILED DESCRIPTION

Embodiments are described herein with reference to the accompanying drawings. Principles disclosed herein may, however, be embodied in many different forms and should not be construed as being limited to the embodiments set forth herein. In the description, details of well-known features and techniques may be omitted to avoid unnecessarily obscuring the features of the embodiments. In the drawings, like reference numerals in the drawings denote like elements.

Embodiments relate to allocating functions and operations associated with an information service across a plurality of computing devices in a telecommunication system that are organized hierarchically. The hierarchy may include multiple levels each corresponding to services at least some of which are operated by different entities where one of the levels includes one or more edge devices. To allocate functions and operations across multiple levels of computing devices, an orchestrator may use a set of rules. When certain events are detected, the orchestrators can dynamically update the allocations of service components to the computing devices.

The information service described herein refers to a service that includes at least one of providing, collecting, or processing data or information to or from or between users and devices using telecommunication infrastructure. Example information services include, among others, Internet broadcasting services, social networking services, messaging services, web hosting services, augmented reality (AR) processing, gaming, virtual reality (VR) programming, video messaging, video surveillance, remote monitoring, drone control, smart city applications, navigation, connected vehicle applications, fleet management, asset tracking, assisted driving, automated driving support, precision agriculture, robot control, factory automation, health monitoring, activity tracking, recommendations, among others.

A service component of an information service refers to a discrete functional software or hardware component in a computing device that operate in conjunction with at least one other service component to provide the information service. A plurality of service components may be deployed and operated across multiple computing devices using virtualization to provide the information service. Examples of a service component include load balancing, data anonymization, data aggregation, data transformation (e.g., reformatting or conversions), alarming, threshold detection, pattern recognition (e.g., speech, video, image, etc.), remote control, encryption, authentication, authorization, rating, accounting, billing, routing, enrichment, trending, prediction, reporting, home automation, among others.

The edge device described herein refers to an electronic device having resources to host at least one service component of an information service and also function as an access point to a network for providing the information service. The resources in the edge device can be either hardware or software that are configurable based on a command received from an external source (e.g., an orchestrator). Example edge devices may include micro data centers, edge routers, provider edge routers, aggregation routers, customer premise equipment (CPE), set-top boxes, cloudlets, fog nodes, wireless access points, wireless base stations, Long Term Evolution (LTE) protocol nodes such as an Evolved Node B, cable modems, DSL modems, optical termination points, reconfigurable optical add-drop multiplexer (ROADM), road side units, onboard computers, connected vehicles, satellite receivers, ground stations, digital subscriber line access multiplexer (DSLAM), switches, cable modem termination system (CMTS), broadband gateways, among others.

Overview of Example System

Figure (FIG. 1 is a diagram of a telecommunication system 100 for providing information services, according to one embodiment. The system 100 includes one or more cloud servers 105, one or more telecommunication servers 115, one or more edge devices 120, one or more gateways 125, one or more client devices 130, one or more local orchestrators 140, and a hierarchical orchestrator 150, connected to each other via a network 110. In other embodiments, different and/or additional components can be included in the system 100.

Computing devices of the system 100 provide information services to other computing devices by deploying and executing service components. For instance, a cloud server 105, telecommunication server 115, edge device 120, and gateway 125 provide information service to a client device 130. Service components of information services may include software components, hardware components, or a combination thereof. Further, service components may be customized to a given type of information services. As examples, a graphics processing unit (GPU) in a computing device is a service component customized for executing image processing applications of an information service, and a database is a service component customized for executing storage applications of an information service.

A client device 130 (also known as user equipment (UE) or customer premise equipment (CPE)) is a computing device is operated by a user and can communicate data via the network 110. The client device 130 is typically installed in a user's premise or carried by the user. The client device 130 may provide information services or present information via a graphical user interface on a display of the client device 130, in some embodiments. Example client devices 130 include conventional computer systems such as a desktop or laptop computer, a mobile telephone, a smartphone, tablet, or wearable device, among others.

A gateway 125 is a computing device that connects client devices 130 to other computing devices of the system 100 and facilitates interoperability between various computing devices. Similar to a client device 130, the gateway 125 is typically installed on the user's premises or carried by the user, and enable the client devices 130 to communicate over the network 110. Further, the gateway 125 may connect multiple networks having different network protocols by performing protocol conversions. In some embodiments, the gateway 125 serves as a proxy server or a firewall server in the network 110. Example gateways 125 includes, for example, internet of things (IOT) gateways, BLUETOOTH® gateways, onboard communication devices, personal gateways, wireless access points, among others. Additionally, an edge device 120 may perform functionality of a gateway 125, in some embodiments.

Other types of computing devices shown in FIG. 1 including the cloud servers 105, telecommunication servers 115, and edge devices 120 are further described in detail below with respect to FIGS. 6-8.

The hierarchical orchestrator 150 and the local orchestrators 140 (collectively referred to herein as "orchestrators" or an "orchestrator") allocate service components to cloud servers 105, telecommunication servers 115, and edge devices 120 to provide information services to one or more users. The orchestrators may allocate service components based on characteristics of different cloud servers 105, telecommunication servers 115, and edge devices 120. For example, if a given cloud server 105, telecommunication server 115, or an edge device 120 includes available resources that are suitable for deploying and executing a certain service component for providing a particular type of information service, the orchestrators may allocate the service components to that cloud server 105, telecommunication server 115, or edge device 120. The hierarchical orchestrator 150 and the local orchestrators 140 are described in detail below with respect to FIGS. 4-5. An orchestrator may be embodied on a computing device executing, for example, VMWARE® and OPENSTACK®.

The network 110 includes any combination of local area networks (LAN), wide area networks (WAN), wired or wireless networks, private networks, or virtual private networks, among other types of networks. The network 110 may communicate data in a control plane as well as a user plane. Data transmitted over the control plane include signal traffic such as control packets between routers in the network 110. Data transmitted over the user plane (also known as the data plane, forwarding plane, carrier plane, or bearer plane) include user traffic through routers to computing devices of the network 110 such as client devices 130. In one embodiment, the orchestrators receive resource tracking information from computing devices via the control plane, and allocate user plane resources for service components to resources of the computing devices.

Example Hierarchical Architecture

Figure 2A:
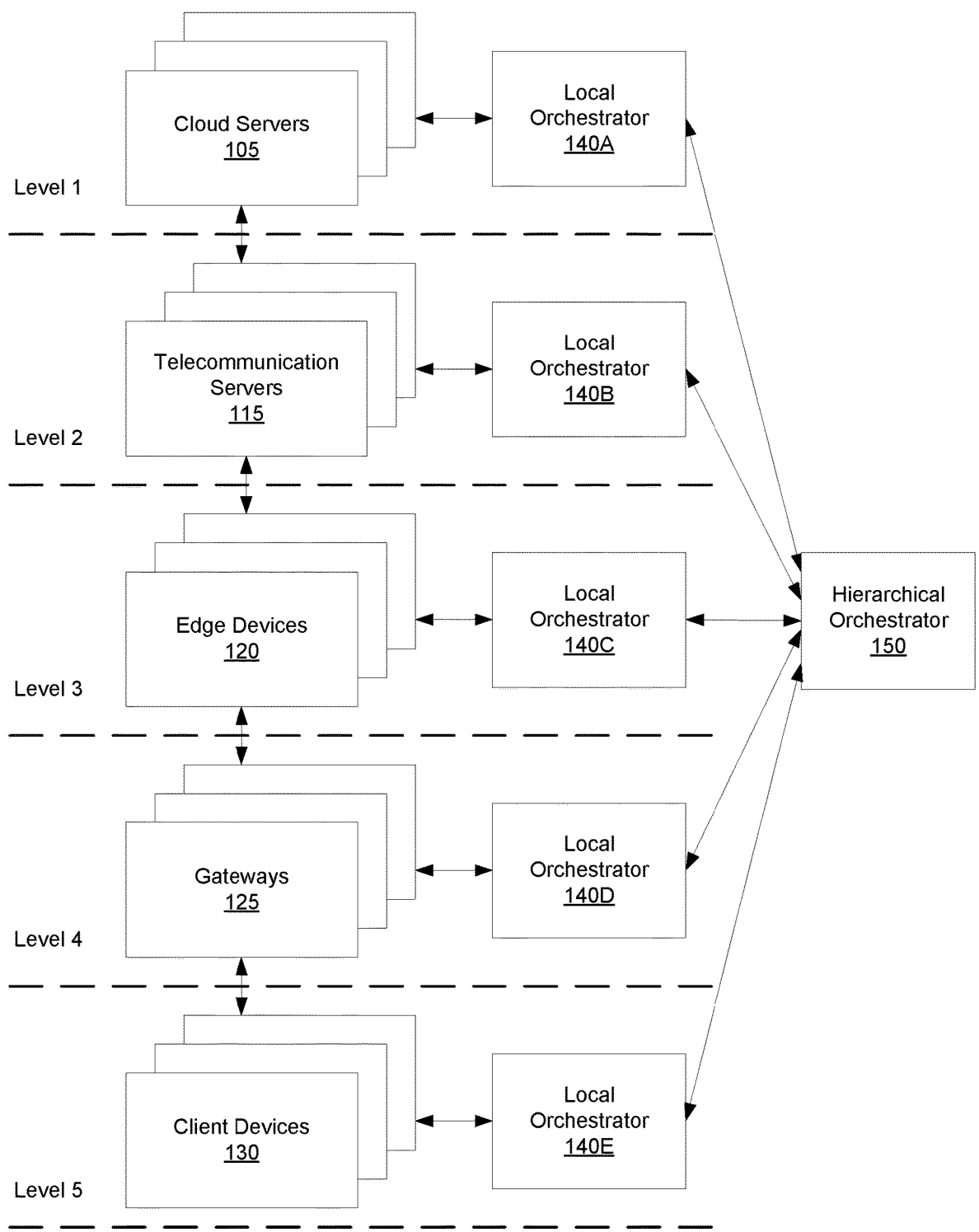
FIG. 2A is a conceptual diagram of a hierarchical architecture of computing devices, according to one embodiment.

FIG. 2A is a conceptual diagram of a hierarchical architecture of computing devices, according to one embodiment. In the example shown in FIG. 2A, levels 1 through 5 of the hierarchical architecture include cloud servers 105, telecommunication servers 115, edge device 120, gateways 125, and client devices 130, respectively, which may also be referred to generally as "nodes." In other embodiments, the hierarchical architecture may include any number of levels, and levels may include other types of computing devices or a different order of computing devices across the hierarchy levels.

The hierarchical orchestrator 150 may communicate with the local orchestrators 140A-E to track resources and allocate service components over the entire hierarchical architecture. Based on various factors or consideration (e.g., available resources on computing devices, the nature of the service components and regulatory restrictions, performance objectives, latency, complexity of calculations, proximity of other service components, availability of data, high availability objectives, failure recovery constraints, affinity and non-affinity rules, cost of resources, traffic forecasts, trends and usage predictions, service-level agreements, administrative domains controlling resources, data privacy, environmental aspects, etc.), the hierarchical orchestrator 150 may assign one or groups of service components to a level. Additionally, the hierarchical orchestrator 150 may assign service components for a particular information service to more than one level. For example, if ten instances of a service component are required, the hierarchical orchestrator 150 may assign eight of the instances to level 2 and the remaining two instances to level 1. Additionally, the hierarchical orchestrator 150 may communicate directly with computing devices in the hierarchical architecture, without an intermediary local orchestrator 140, in some embodiments. As illustrated in FIG. 2A, computing devices may communicate with other computing devices in an adjacent level. For instance, telecommunication servers 115 of level 2 communicate with cloud servers 105 of level 1 and edge devices of level 3. In some embodiments, computing devices may also communicate with other computing devices not necessarily on adjacent levels.

Local orchestrators 140A-E at each level may track resources of and allocate service components to computing devices at each level. The local orchestrators 140A-E may allocate service components to different computing devices based on various factors including among others, geographic locations (e.g., proximity of other service components), capacity/capability of computing devices, current load of the computing devices, performance objectives, latency, availability of data, affinity and non-affinity rules, access interfaces on computing devices, traffic forecasts, forecasted movements of computing devices, historical utilization of resources by a given computing device, importance of other information services running on the computing devices, costs or time associated with deploying the services on the computing devices, and entities operating or owning the computing devices. A local orchestrator 140 may alert the hierarchical orchestrator 150 that service components need to be re-allocated. The alert may be a regular update from the local orchestrator 140 to trigger re-allocation, or due to an exceptional event such as a change in availability of resources in the hierarchy. In some embodiments, a local orchestrator 140 may be omitted for all or a subset of levels. In such embodiments, the hierarchical orchestrator 150 may perform allocation of service components for all or the subset of levels.

In some embodiments, the computing devices and orchestrators may be owned and/or operated by different entities. For example, a cloud service provider owns and operates the cloud servers 105 and the corresponding local orchestrator 140A, while a telecommunication service provider owns and operates the telecommunication servers 115 and the corresponding local orchestrator 140B, etc. The entity that owns the hierarchical orchestrator 150 may have greater control over trade-offs in resource allocation among computing devices in the hierarchical architecture.

Figure 2B:
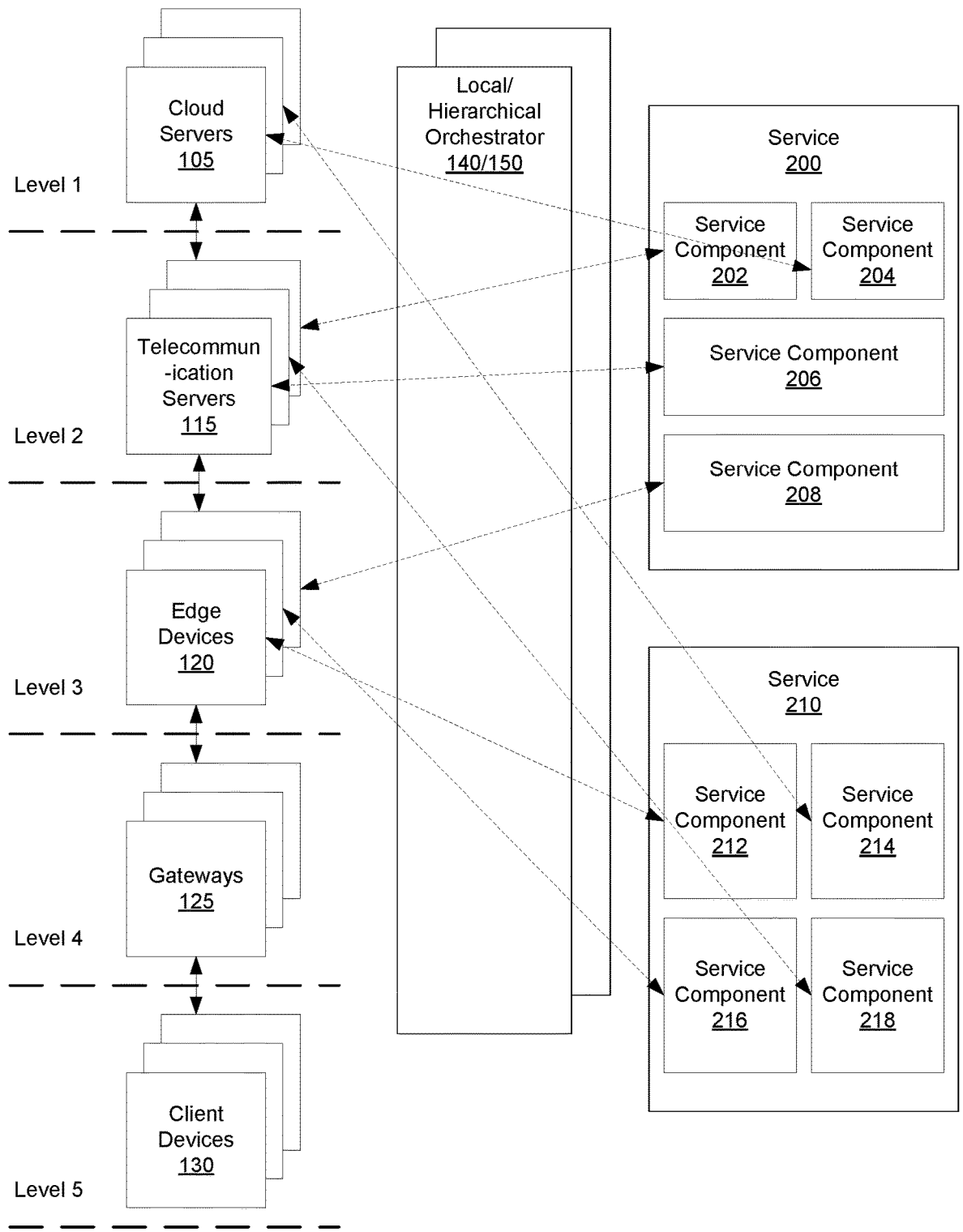
FIG. 2B is a conceptual diagram of service components allocated to the hierarchy of computing devices shown in FIG. 2A, according to one embodiment.

FIG. 2B is a conceptual diagram of service components allocated to the hierarchy of computing devices shown in FIG. 2A, according to one embodiment. In the example shown in FIG. 2B, services 200 and 210 each include various types of service components for deployment and execution by computing devices of the hierarchical architecture. The hierarchical orchestrator 150 and any number of local orchestrators 140 operate together to allocate the service components to the computing devices. For instance, the orchestrators allocate service components 202, 204, 206, and 208 of service 200 to the telecommunication servers 115, cloud servers 105, telecommunication servers 115, and edge devices 120, respectively. Additionally, the orchestrators allocate service components 212, 214, 216, and 218 of service 210 to the edge devices 120, cloud servers 105, edge devices 120, and telecommunication servers 115, respectively.

Figure 3:
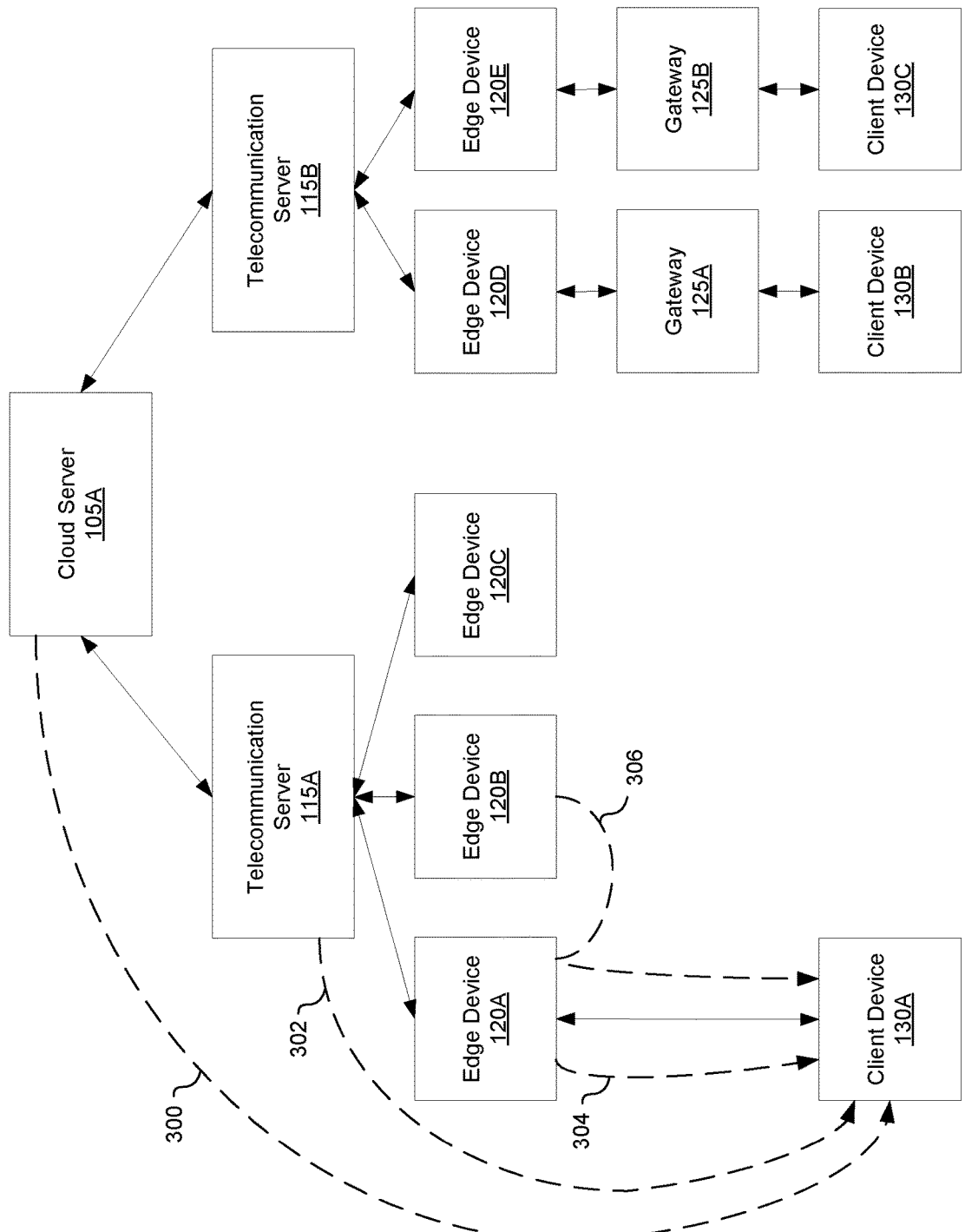
FIG. 3 is a hierarchy diagram illustrating of communication between computing devices in a hierarchical architecture, according to one embodiment.

FIG. 3 is a hierarchy diagram illustrating of communication between computing devices in a hierarchical architecture, according to one embodiment. In the example shown in FIG. 3, the hierarchical architecture includes organizations of computing devices that are not necessarily symmetrical. In particular, telecommunication server 115A communicates with three edge devices 120A, 120B, and 120C, while telecommunication server 115B communicates with two edge devices 120D and 120E. In addition, edge device 120A communicates directly with client device 130A. However, edge devices 120D and 120E are communicate indirectly with client device 130B and 130C via gateways 125A and 125B.

Computing devices of the hierarchical architecture may communicate with other computing devices both in adjacent levels and non-adjacent levels. For example, the cloud server 105A, telecommunication server 115A, and edge device 120A may each directly provide information service to the client device 130 via connections 300, 302, and 304, respectively. In other words, the cloud server 105A does not need to communicate to the client device 130A via the intermediary telecommunication server 115A and edge device 120A in the hierarchical architecture. Further, computing devices may communicate with other computing devices on the same level. For instance, edge device 120B may provide information service to the client device 130 by a connection 306 with the edge device 120A on the same level.

The latency or network connection speed between computing devices may be based on the number of intermediate nodes of in the hierarchical architecture, in some embodiments. For example, the latency between the cloud server 105A and the client device 130A is greater than the latency between the edge device 120A and the client device 130A because there are more intermediate nodes between the former pair than the latter pair. Thus, it may be advantageous for the edge device 120A, instead of the cloud server 105A, to execute a service component that requires low latency to provide an information service to the client device 130A.

Example Orchestrators

Figure 4:
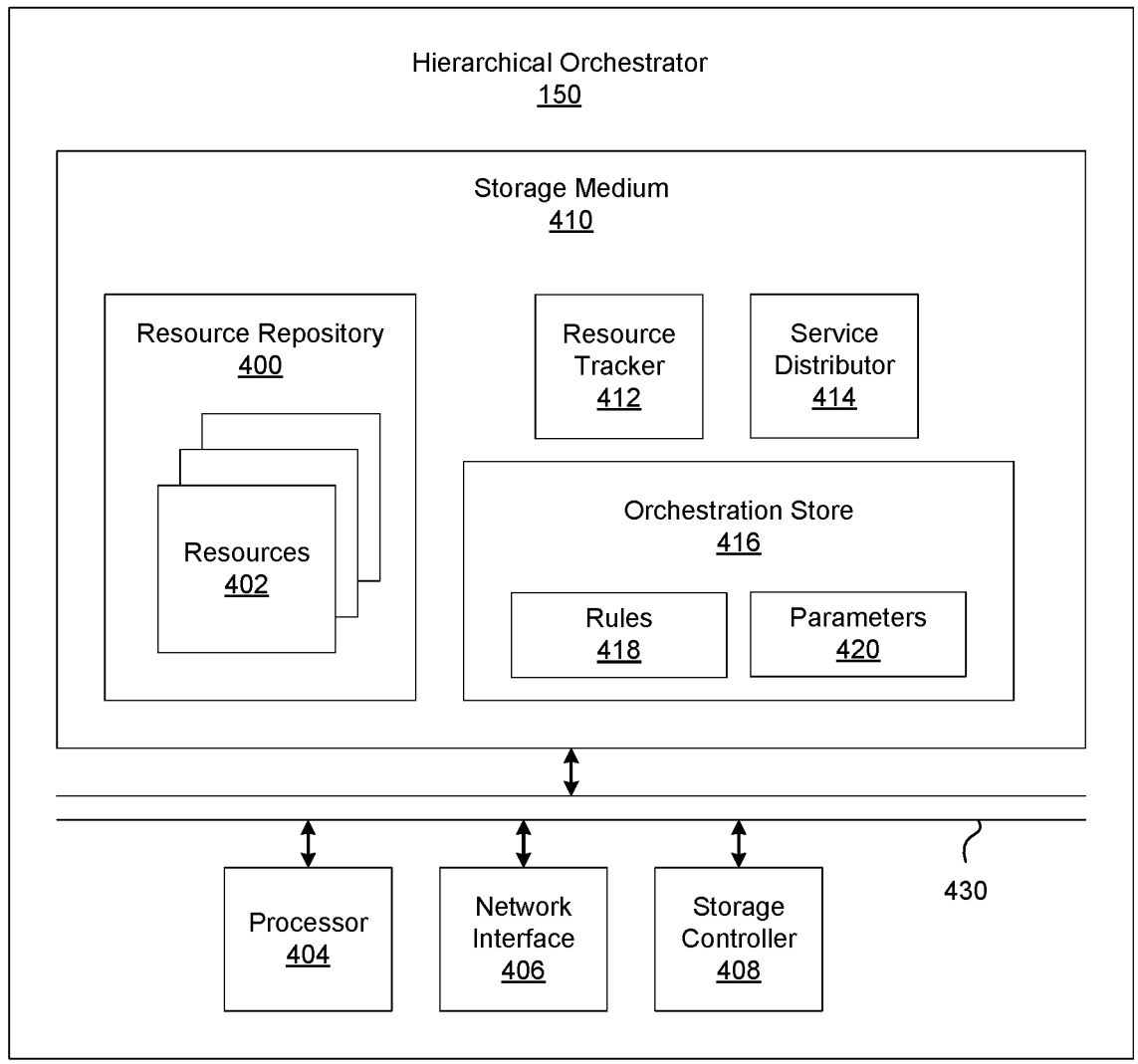
FIG. 4 is a block diagram of a hierarchical orchestrator according to one embodiment.

FIG. 4 is a block diagram of a hierarchical orchestrator 150, according to one embodiment. The hierarchical orchestrator 150 includes, among other components, a storage medium 410, a processor 404, a network interface 406, a storage controller 408, and a bus 430 connecting these components. The processor 404 executes instructions stored in the storage medium 410. The network interface 406 communicatively connects the hierarchical orchestrator 150 over the network 110 to external systems, such as various computing devices or local orchestrators 140.

The storage controller 408 manages operation of the storage medium 410. The storage controller 408 controls reading of data from the storage medium 410 for processing by the processor 404. The storage controller 408 may also control writing of data to the storage medium 410 received from various subcomponents of the hierarchical orchestrator 150 or from external systems.

The storage medium 410 is a non-transitory computer-readable storage medium storing, among other software components, a resource repository 400, a resource tracker 412, a service distributor 414, and an orchestration store 416. The storage medium 400 may also include software components not illustrated in FIG. 4 such as an operation system (OS). In some embodiments, the storage medium 410 is implemented as random-access memory (RAM) or other types of memory hardware.

The resource repository 400 stores one or more types of resources 402. The resources 402 may include software service components deployed in the computing devices and information indicating locations where the computing devices can fetch the software service components for deploying in the computing devices. In some embodiments, the hierarchical orchestrator 150 does not include resource repository 400 and instead relies upon other servers to store and provide resources for deploying service components in the computing devices. The resources 402 may also be cached in local orchestrators 140 or other computing devices to expedite deployment of associated service components.

The resource tracker 412 monitors resources of multiple computing devices in a hierarchical architecture. In embodiments where the system 100 includes one or more local orchestrators 140, the resource tracker 412 can keep track of collective resources of computing devices of a level in the hierarchy, instead of tracking resources of individual computing devices. The resource tracker 412 may track, for example, current and historical demand for resources, assignments of service components to resources of the computing devices, performance requirements of service components, or characteristics of resources and computing devices in the hierarchical architecture. Types of the characteristics may include compute characteristics (e.g., CPU type, number of CPUs, CPU speed or latency, etc.), storage characteristics (e.g., volatile or non-volatile memory, storage volume in gigabytes or terabytes, read and write latency, etc.), networking characteristics (e.g., number of interfaces and network speed), node geographical location (e.g., jurisdiction, country, or longitude and latitude coordinates of the computing devices), node connectivity (e.g., nearby computing devices, connection speed, etc.), and access connectivity (e.g., fiber connection, radiofrequency access, spectrum, bandwidth, cell identification, etc.), among other characteristics.

The orchestration store 416 stores rules 418 and parameters 420 used by the hierarchical orchestrator 150 to allocate service components. The orchestration store 416 may store characteristics and other information about resources and computing devices tracked by the resource tracker 412 as parameters 420. The rules may be applicable to a certain information services or computing device and describe criteria for resource allocation. The criteria of the rules may indicate, for example, required capabilities of resources, performance requirements (e.g., latency) of service components, regulations, or business criteria (e.g., according to a contract or service-level agreement (SLA)). For example, a rule indicates that a service component needs to be allocated to a resource located within an approved jurisdiction or geographical location, e.g., due to export regulations of sensitive data. A rule to satisfy requirements of a service-level agreement may, indicate that a cost (e.g., a monetary cost) of allocating the service component to a given resource must be less than a threshold cost. Additionally, rules 418 for allocating service components to different computing devices may be based on the various factors used by local orchestrators 140, as previously described, including affinity rules and proximity to a data set, whether the service component can be shared by many subscribers or end devices, geographical scope, high availability objectives, among others.

The service distributor 414 allocates service components of information services to the computing devices in the hierarchical architecture. The service distributor 414 may apply parameters 420 using the rules 418, each retrieved from the orchestration store 416, to determine allocations of the service components. In one embodiment, the service distributor 414 determines allocations in response to a request for an information service or when a service component is instantiated or terminated. In some embodiments, the service distributor 414 may change the allocated computing devices while the service components are already running or in progress. That is, the service distributor 414 may automatically update allocations of service components in real-time to different computing devices in the hierarchical architecture.

Figure 5:
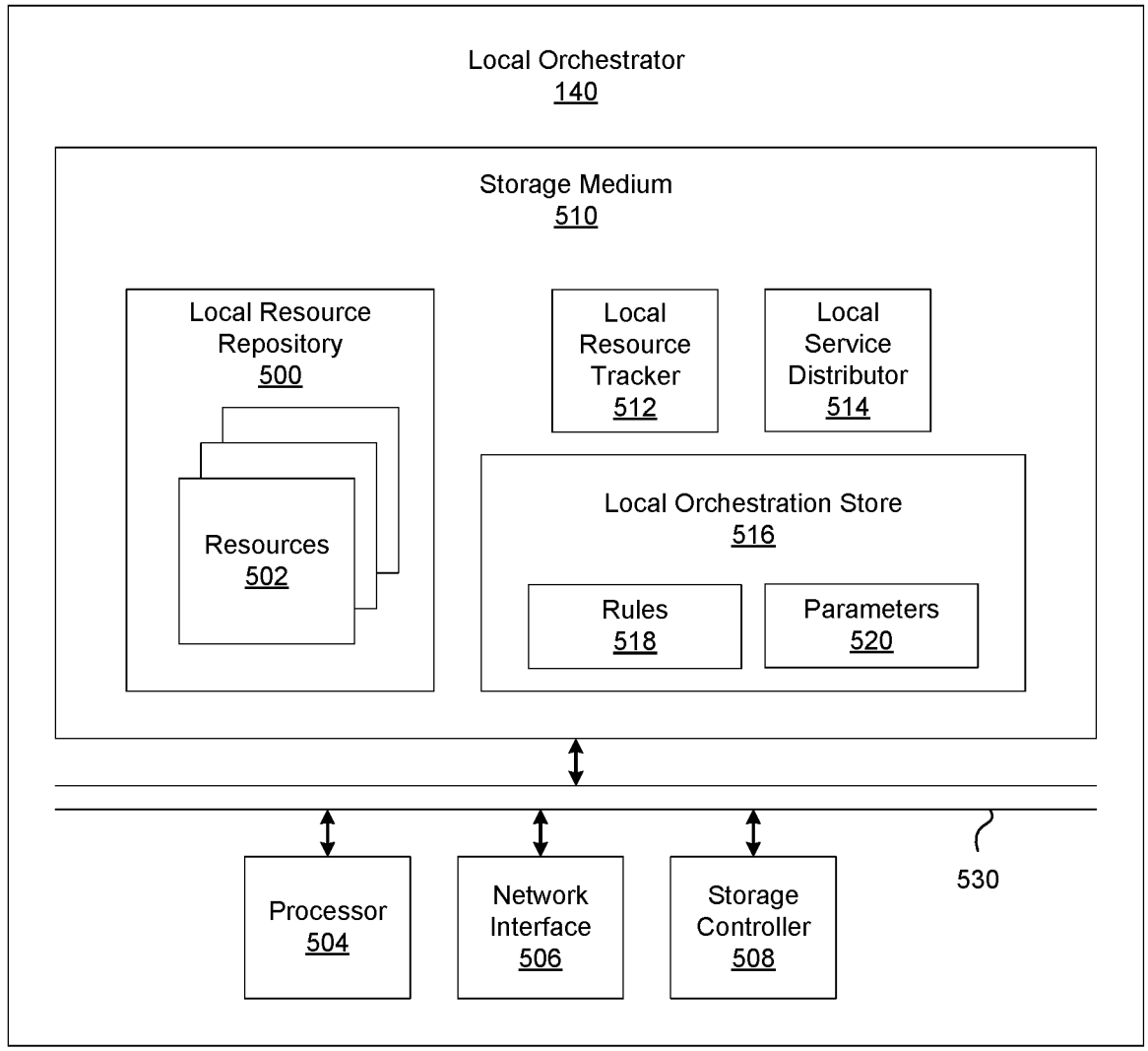
FIG. 5 is a block diagram of a local orchestrator according to one embodiment.

FIG. 5 is a block diagram of a local orchestrator 140, according to one embodiment. The local orchestrator 140 is substantially the same as the hierarchical orchestrator 150 described above but is different in that the local orchestrator 140 tracks and allocates resources to computing devices at the same level in the hierarchy. In contrast, the hierarchical orchestrator 150 interfaces vertically across multiple levels of the hierarchy to determine allocations. The local orchestrator 140 includes, among others, a storage medium 510, a processor 504, a network interface 506, a storage controller 508, and a bus 530 connecting these components. The storage medium 510 includes a local resource repository 500, local resource tracker 512, local service distributor 514, and local orchestration store 516. The local resource tracker 512 monitors resources of the local resource repository 500 at the same level of the hierarchy. The local service distributor 514 may communicate with the service distributor 414 of the hierarchical orchestrator 150 to manage service components at the local level. In addition, the local service distributor 514 may use rules from the local orchestration store 516 to determine the allocations. The local orchestrator 140 may also communicate with the hierarchical orchestrator 150 to provide resource information at the corresponding level, or to receive resource information about other levels in the hierarchical architecture.

Example Computing Devices

Figure 6:
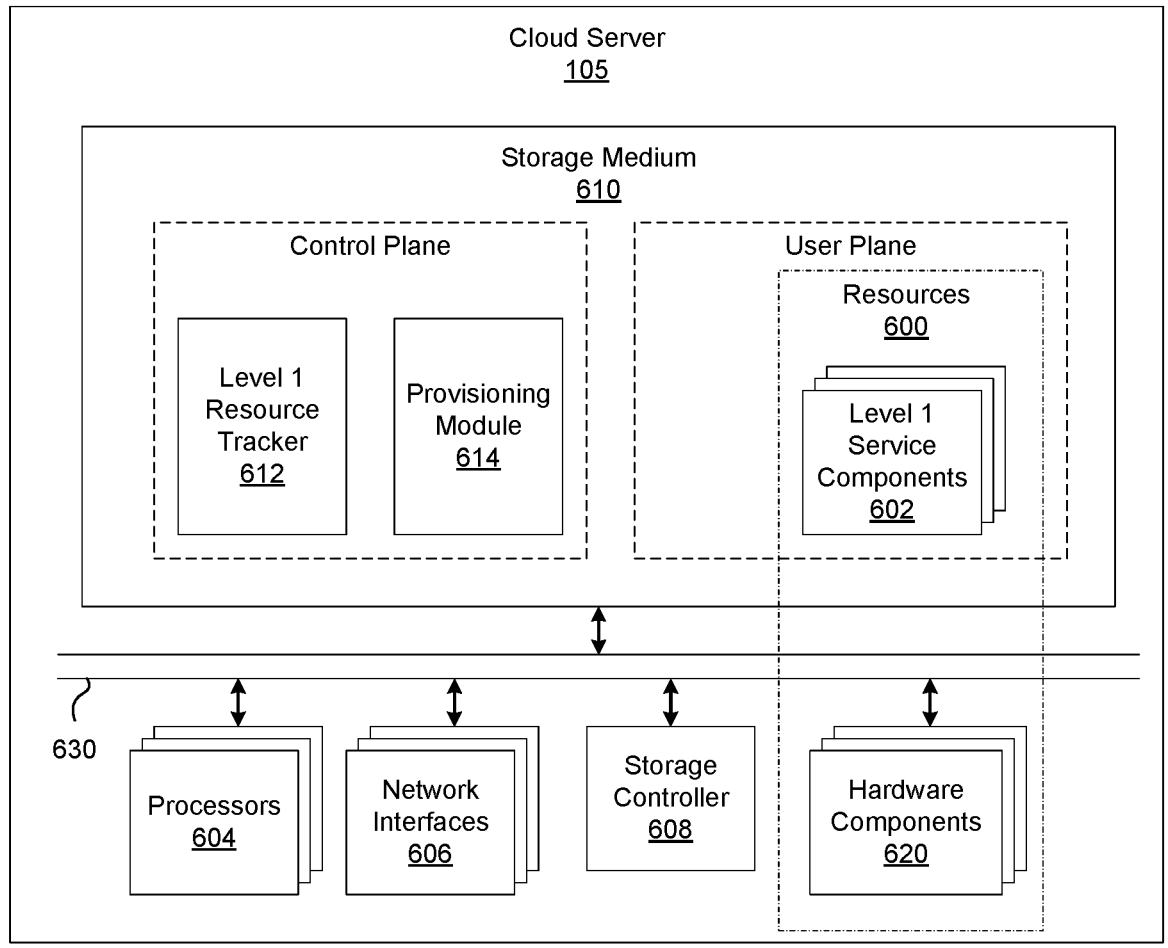
FIG. 6 is a block diagram of a cloud server for executing service components, according to one embodiment.

FIG. 6 is a block diagram of a cloud server 105 for executing service components, according to one embodiment. The cloud server 105 includes, among others, a storage medium 610, one or more processors 604, one or more network interfaces 606, a storage controller 608, one or more hardware components 620, and a bus 630 connecting these components. Hardware components 620 may include, for example, sensors, antennas, GPUs, display devices, I/O interfaces, etc. The one or more processors 604 execute instructions stored in the storage medium 610. The one or more network interfaces 606 are configured to communicatively connect the cloud server 105 over the network 110 to external systems, such as various computing devices or orchestrators.

The storage controller 608 manages the operation of the storage medium 610. The storage controller 608 may read data from the storage medium 610 for processing by the one or more processors 604. The storage controller 608 may also write data to the storage medium 610 received from various subcomponents of the cloud server 105 or from external systems.

The storage medium 610 is a non-transitory computer-readable storage medium storing, among others, a level 1 resource tracker 612, provisioning module 614, and resources 600. The storage medium 610 may also include software components not illustrated in FIG. 6 such as an operation system (OS). In some embodiments, the storage medium 610 is implemented as random-access memory (RAM) or other types of memory hardware.

Software components of the resources 600 operate on the user plane of the network 110 and include any number of allocated level 1 service components 602. The resources 600 may include any combination of hardware or software resources. Example level 1 service components 602 include a national content catalog for a content distribution network service, a global messaging hub for a messaging service, a global user list for an operation management service, or a component that prepares and generates consolidated reports on alarms. The resources 600 may also store parameters used by the level 1 service component 602. The parameters may include, among others, virtualization parameters to configure a virtual machine instantiated on the cloud server 105, a global content list, a global content repository, or consolidated sensor metrics. In some embodiments, the hardware components 620 may also embody one or more of the level 1 service components 602.

The level 1 resource tracker 612 and provisioning module 614 operate on the control plane of the network 110. The level 1 resource tracker 612 monitors the resources 600 of the cloud server 105. The level 1 resource tracker 612 may track, for example, current and historical demand for the resources 600, assignments of service components to the resources 600, performance requirements of service components, or characteristics of the resources 600 (previously described with respect to the hierarchical orchestrator 150). The level 1 resource tracker 612 may provide the tracked resource information to orchestrators or the provisioning module 614.

The provisioning module 614 provisions and deploys service components of information services as resources in the cloud server 105 according to resource information received from the level 1 resource tracker 612 or instructions received from an orchestrator. In particular, the provisioning module 614 may provide provisioning information to instantiate a service component in the cloud server 105. In some embodiments, the provisioning module 614 may also provision and deploy service components as resources in other computing devices (of the hierarchical architecture shown in FIGS. 2A-B) communicating with the cloud server 105. The provisioning module 614 may store information used by a provisioning module of another computing device in a different level of the hierarchy. As an example use case, the provisioning module of a telecommunication server 115 may communicate with the provisioning module 614 for assistance to instantiate service components. Further, the provisioning module 614 may provision and deploy service components of a virtual machine onto a telecommunication server 115 and edge device 120, e.g., to load-balance the payload of the cloud server 105 or to satisfy a rule defined in an orchestrator.

Figure 7:
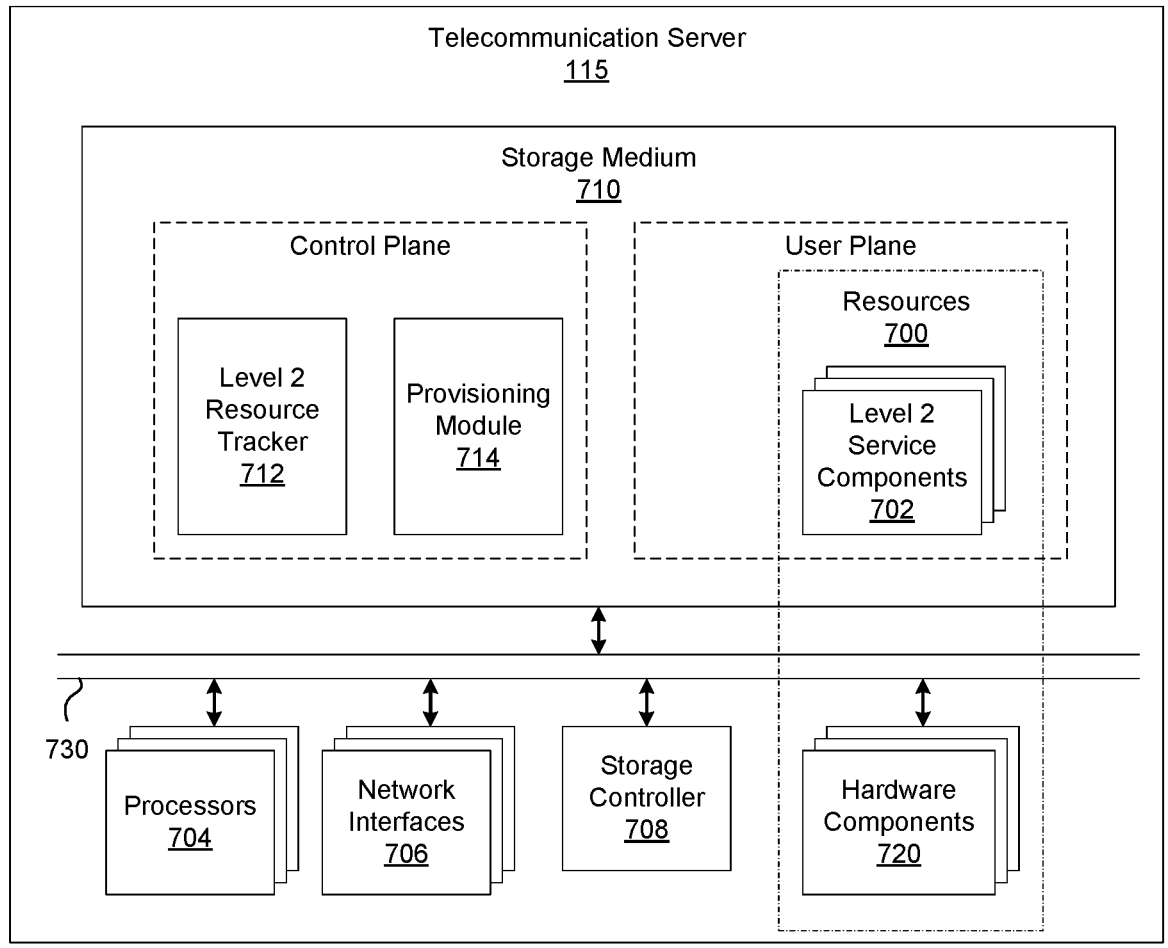
FIG. 7 is a block diagram of a telecommunication server, according to one embodiment.

FIG. 7 is a block diagram of a telecommunication server 115 according to one embodiment. The telecommunication server 115 may be distinguished from other servers in that it is operated by telecommunication operators and that its serves as the gateway to a walled domain of a network operator. Thus, the telecommunication server 115 may also include security and firewall rules, a portal for external access, accounting procedures, and monitoring to ensure high availability. The functions and operations of components in the telecommunication server 115 are substantially the same as those of the cloud server 105 described above with reference to FIG. 6 except that the level 2 resource tracker 712 of the telecommunication server 115 monitors resources for level 2 service components 702, which are on a different level than level 1 service components 602 (of a cloud server 105) in the hierarchical architecture shown in FIGS. 2A-B. Further, the telecommunication server 115 does not include a provisioning module in some embodiments. The telecommunication server 115 may receive service components from a cloud server 105 for allocation to the resources 700.

Figure 8:
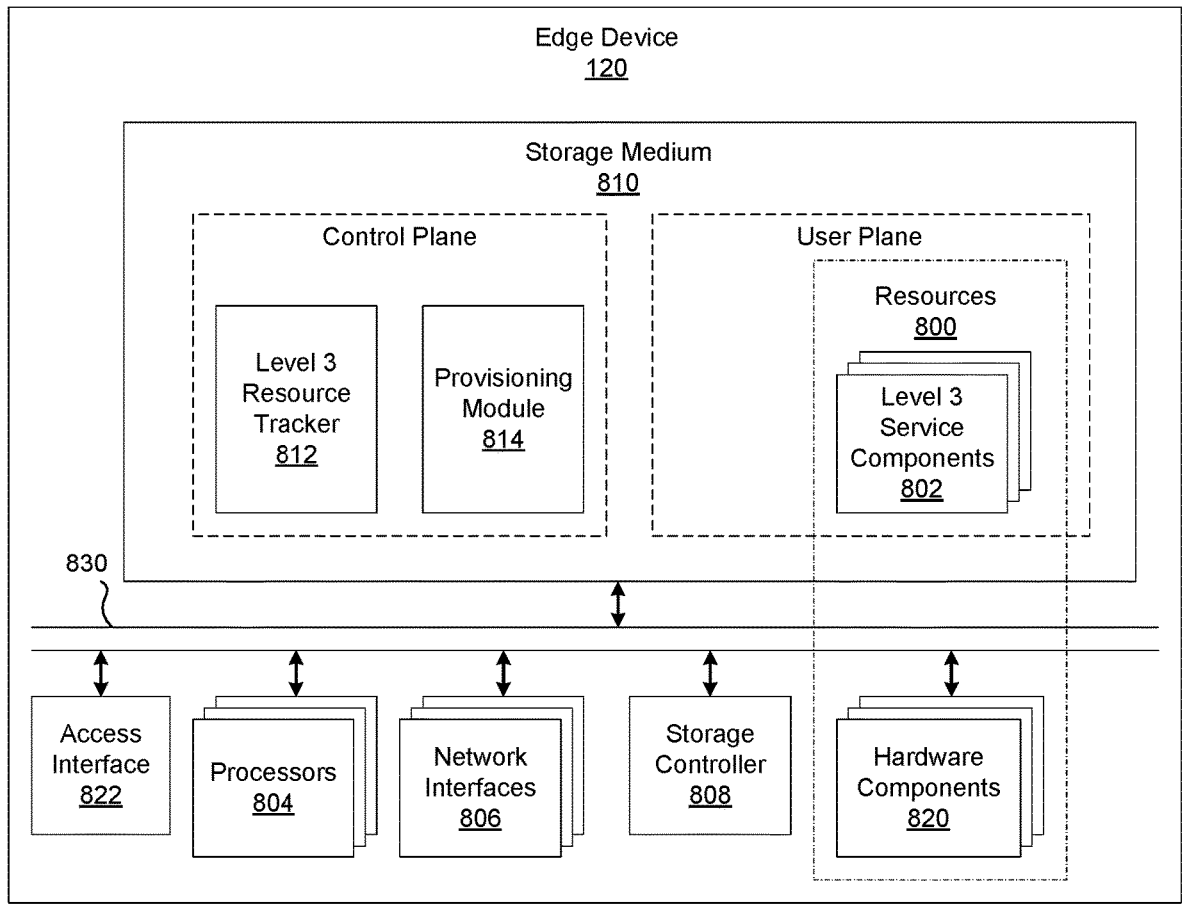
FIG. 8 is a block diagram of an edge device, according to one embodiment.

FIG. 8 is a block diagram of an edge device 120 according to one embodiment. The edge device 120 is different from other servers or computing device in that it functions as an access point to a network (e.g., network 110) and is in proximity to end users and end devices such as client devices 130. Thus, the edge device 120 may also include information describing context or activity in the proximity of the edge device 120 such as radio conditions, weather information, local traffic, precise device location, or confidential information that cannot be shared with higher levels in the hierarchy (e.g. if the edge device 120 is a CPE located in a secured factory). The function and operations of components in the edge device 120 are substantially the same as the cloud server 105 or the telecommunication server 115, except that (i) the level 3 resource tracker 812 of the edge device 120 monitors resources for level 3 service components 802, which are on a different level than level 1 or level 2 service components 602 and 702 (of a cloud server 105 and telecommunication server 115, respectively) in the hierarchical architecture shown in FIGS. 2A-B and that (ii) the edge device 120 also includes an access interface 822 to enable the edge device 120 to function as an access point to the network 110. The access interface 822 may enables a wired or wireless connection to a client device 130 using various protocols.

The edge device 120 may receive service components from an orchestrator or other computing devices via the network 110 for deployment and execution.

Example Sequence Diagrams

Figure 9A:
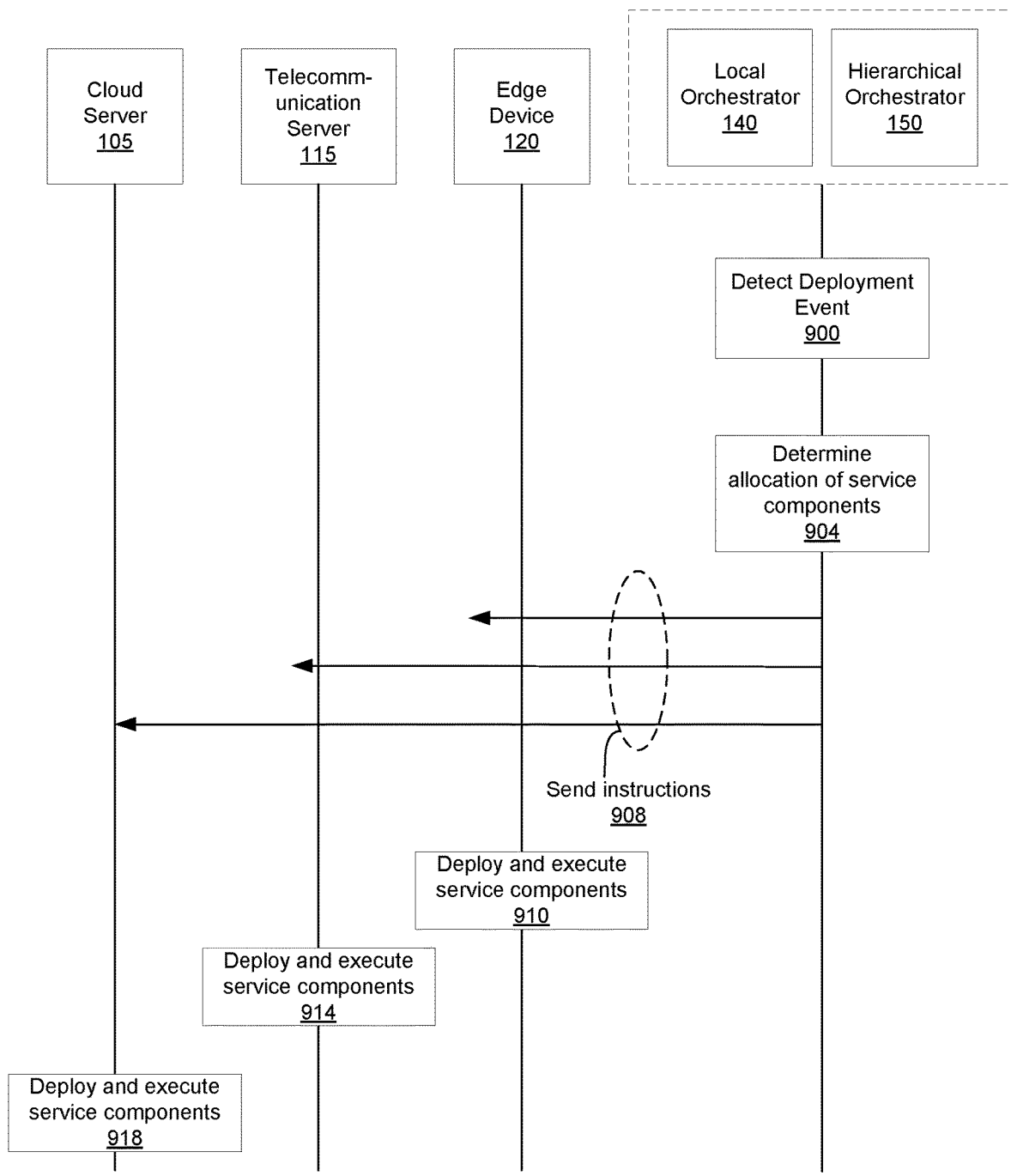
FIG. 9A is an interaction diagram illustrating a process for deploying of service components, according to one embodiment.

FIG. 9A is an interaction diagram illustrating a process for deploying service components in the telecommunication system 100, according to one embodiment. The orchestrators 140 and 150 detect 900 a deployment event such as receiving a request for an information service from the client device 130 at an edge device 120 or a gateway 125.

As a result of detecting the event, the orchestrators 140 and 150 determine 904 how service components of the information service are to be allocated across computing devices in different levels. For this purpose, the orchestrators 140 150 may receive information about available resources of computing devices in different levels. Based on the resource information, nature of the service components, and/or applied rules (previously described with respect to the orchestration store 416 shown in FIG. 4), the orchestrators 140 and 150 allocate service components to the cloud server 105, telecommunication server 115, and edge device 120.

Then, the orchestrators 140 and 150 sends 908 instructions to computing devices in different levels, either directly or based on further determination by local orchestrators 140. Responsive to their instructions, the cloud server 105, telecommunication server 115, and edge device 120 each deploy and execute 910 the allocated service components.

Although the example shown in FIG. 9A includes a cloud server 105, telecommunication server 115, edge device 120, client device 130, and orchestrators 140 and 150, in other embodiments, the system environment may include any number or other types of computing devices or orchestrators.

Figure 9B:
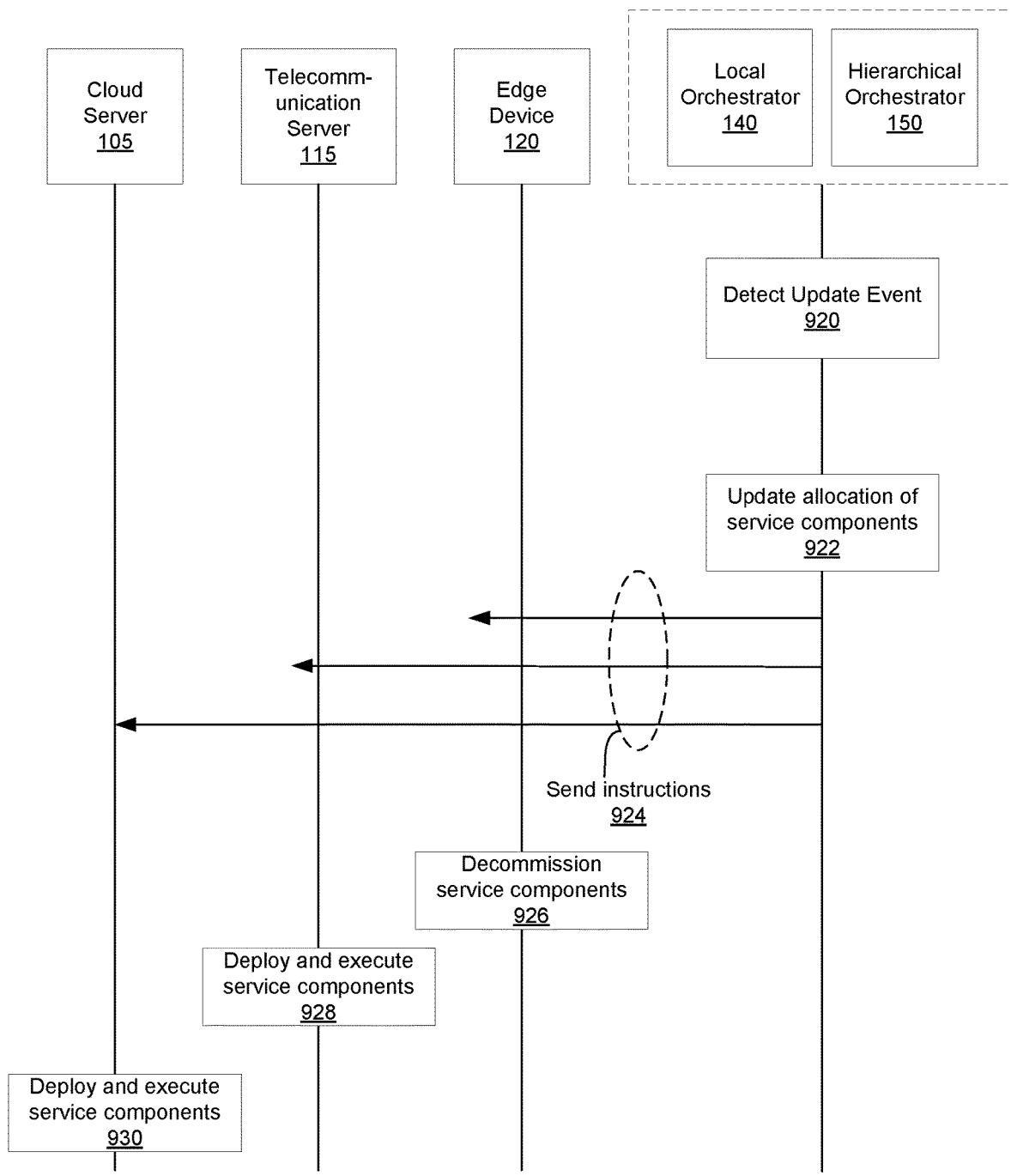
FIG. 9B is an interaction diagram illustrating a process for updating the allocation of service components, according to one embodiment.

FIG. 9B is an interaction diagram illustrating a process for updating the allocation of service components, according to one embodiment. The orchestrators 140 and 150 detect 920 an update event, e.g., indicating that the edge device 120 has an increase in traffic or payload, or has experienced a network failure.

Based on the update event, the orchestrators 140 and 150 update 922 the allocation of service components to the computing devices of the hierarchical architecture. In particular, the orchestrators 140 and 150 determine how service components installed in computing devices at various levels are to be reassigned.

The orchestrators 140 and 150 send 924 instructions to computing devices previously allocated with service components and to computing devices to be newly deployed with service components. Responsive to the instructions, the edge device 120 decommissions service components that have been re-allocated to another computing device. Additionally, the cloud server 105 and the telecommunication server 115 deploy and execute the re-allocated service components from the edge device 120.

Although the example of FIG. 9B is illustrated as decommissioning an edge device 120, other computing devices (e.g., cloud server 105 or telecommunication server 115) can be decommissioned while the edge device 120 is newly deployed with service components. In some embodiments, the orchestrators 140 and 150 reshuffle service components without decommissioning a computing device previously allocated with at least one service component. Rather, the orchestrators 140 and 150 may perform load-balancing by increasing or decreasing the amount of service components allocated to a given computing device.

Example Process Flow

FIG. 10 is a flow chart illustrating a process 1000 for allocating service components to computing devices that are hierarchically structured, according to one embodiment. A hierarchical orchestrator 150 determines 1010 allocation of service components of an information service to resources of a first set of computing devices that are hierarchically structured. The hierarchical orchestrator 150 sends 1020 first instructions causing the first set of computing devices to deploy and execute the allocated service components to provide the information service, e.g., for a client device 130. The hierarchical orchestrator 150 may receive updates from the first set of computing devices or local orchestrators 140 indicating if the service components were successfully instantiated, or if conditions at a local level have changed (e.g., a change in available resources in the hierarchy) and re-allocation of service components is required.

The hierarchical orchestrator 150 detects 1030 an update event after deploying the service components to the first set of computing devices according to the first instructions. The hierarchical orchestrator 150 may determine that an update event is triggered in response to periodic usage data received from the computing devices or local orchestrators 140. In some embodiments, the hierarchical orchestrator 150 can use artificial intelligence or a machine learning model to process the periodic usage data to predict update events based on trends in resource utilization, demand, or other external events. In other embodiments, instead of detecting the update event, the hierarchical orchestrator 150 may receive information about the update event, for example, from an alert provided by a local orchestrator 140. Responsive to detecting the update event, the hierarchical orchestrator 150 automatically updates 1040 the allocation of the service components to a second set of computing devices that are hierarchically structured. In some embodiments, the second set is different than the first set, e.g., includes at least one computing device not in the first set, or excludes at least one computing device of the first set. In other embodiments, the first and second sets include the same computing devices, but the particular allocation of service components among the same computing devices is different. The hierarchical orchestrator 150 sends 1050 second instructions causing the second set of computing devices to deploy and execute the allocated service components to provide the information service. In some embodiments, the hierarchical orchestrator 150 may determine to not take immediate action in response to detecting an update event, and determine to wait for further updates before taking action such as updating allocations.

In some embodiments, the hierarchical orchestrator 150 determines allocations or updates allocations of service components by applying one or more rules from the orchestration store 416 associated with the computing devices. A rule may indicate that service components executed by a given computing device need to be re-allocated if there is a failure in the network 110 that impacts the performance of the given computing device (e.g., high latency resulting in slower performance of the information service). In addition, a rule may indicate that service components need to be allocated to provide greater performance (e.g., less latency) due to the update event. For instance, the update event indicates that a user of information service requested a new service-level agreement (SLA), or indicates that traffic is increasing on a computing device that causes the available resources to drop below a threshold level for executing service components.

The hierarchical orchestrator 150 may determine allocations based on trade-offs for certain levels computing devices in the hierarchical architecture, in some embodiments. In an example use case, the hierarchical orchestrator 150 is operated by a telecommunication service provider that also owns telecommunication servers 115 in the hierarchical architecture. Thus, the hierarchical orchestrator 150 may determine allocations to increase an amount of traffic to the telecommunication servers 115 given a service level, which may be indicated by target performance requirements. In another example, the hierarchical orchestrator 150 is operated by a third party owner of client devices 130 receiving information services. Thus, the hierarchical orchestrator 150 may determine allocations to increase service level of the information services for users of the client devices 130, e.g., by allocating service components to high-performance resources of computing devices. Further, the hierarchical orchestrator 150 may also determine allocations to reduce resource cost for the users. The optimal allocation of service components under a certain set of conditions may be based on different SLAs associated with the computing devices or providers (e.g., owners and operators of the computing devices) in the hierarchical architecture.

The steps of the process as described in FIG. 10 are merely illustrative. For example, the hierarchical orchestrator 150 may repeat the steps 1030-1050 to update allocations of service components any number of times for subsequent update events. Further, the hierarchical orchestrator 150 may send instructions in parallel or series to different computing devices. In some embodiments, the hierarchical orchestrator 150 performs steps of the process 1000 in conjunction with one or more local orchestrators 140 at multiple levels of the hierarchical architecture. Additionally, steps of the process 1000 may be distributed between the hierarchical orchestrator 150 and a local orchestrator 140, e.g., the hierarchical orchestrator 150 performs steps 1010-1030 and the local orchestrator 140 performs steps 1040-1050 following the update event.

What is claimed is:

1. A method for providing an information service in a network, comprising:
   determining allocation of service components of the information service to resources of a first plurality of computing devices that are hierarchically structured;
   sending first instructions causing the first plurality of computing devices to deploy and execute service components allocated to the first plurality of computing devices to provide the information service;
   detecting, after deploying the service components to the first plurality of computing devices according to the first instructions, an update event comprising an indication of a level of resources in one or more of the first plurality of computing devices dropping below a threshold level;
   automatically updating the allocation of the service components to resources of a second plurality of computing devices that are hierarchically structured, responsive to detecting the update event, wherein the second plurality of computing devices does not include the one or more of the first plurality of computing devices with the level of resources dropping below the threshold level; and
   sending second instructions causing the second plurality of computing devices to deploy and execute service components allocated to each of the second plurality of computing devices to provide the information service.

2. The method of claim 1, wherein automatically updating the allocation of the service components comprises:
   applying at least one rule associated with the information service or a computing device of the second plurality of computing devices to determine the second plurality of computing devices and service components allocated to each of the second plurality of computing devices.

3. The method of claim 2, wherein the at least one rule indicates a threshold latency between a client of the information service and one or more computing devices of the second plurality of computing devices that communicate with the client.

4. The method of claim 2, wherein the at least one rule indicates a geographical region of at least a subset of the second plurality of computing devices.

5. The method of claim 1, wherein detecting the update event comprises:
   determining, using a machine learning model, a trend in utilization of the resources of the first plurality of computing devices.

6. A method for providing an information service in a network, comprising:
   determining allocation of service components of the information service to resources of a first plurality of computing devices that are hierarchically structured;
   sending first instructions causing the first plurality of computing devices to deploy and execute service components allocated to the first plurality of computing devices to provide the information service;
   detecting an update event after deploying the service components to the first plurality of computing devices according to the first instructions;
   automatically updating the allocation of the service components to resources of a second plurality of computing devices that are hierarchically structured, responsive to detecting the update event; and
   sending second instructions causing the second plurality of computing devices to deploy and execute service components allocated to each of the second plurality of computing devices to provide the information service,
   wherein the first plurality of computing devices and the second plurality of computing devices each comprise:
   a first level of computing devices operated by a cloud service provider;
   a second level of computing devices lower in hierarchy than the first level of computing devices, the second level of computing devices operated by a telecommunication service provider separate from the cloud service provider; and
   a third level of computing devices lower in hierarchy than the second level of computing devices, each of the third level of computing devices communicating directly with at least one client.

7. The method of claim 6, wherein at least one service component to service a client is deployed on a first computing device of the third level of computing devices that does not communicate directly with the client.

8. The method of claim 6, wherein the first instructions and the second instructions are sent to a plurality of local orchestrators, each configured to deploy and execute the service components to computing devices in a level of the hierarchy.

9. The method of claim 6, wherein the update event indicates a change in a service level agreement requested by a client of the information service, and wherein automatically updating the allocation of the service components comprises:
   re-allocating service components from resources of the first or second levels of computing devices to resources of the third level of computing devices.

10. A non-transitory computer-readable storage medium storing instructions for providing an information service in a network, the instructions when executed by a processor causing the processor to perform steps including:
    determining allocation of service components of the information service to resources of a first plurality of computing devices that are hierarchically structured;
    sending first instructions causing the first plurality of computing devices to deploy and execute service components allocated to the first plurality of computing devices to provide the information service;

detecting, after deploying the service components to the first plurality of computing devices according to the first instructions, an update event comprising an indication of a level of resources in one or more of the first plurality of computing devices dropping below a threshold level;

automatically updating the allocation of the service components to resources of a second plurality of computing devices that are hierarchically structured, responsive to detecting the update event, wherein the second plurality of computing devices does not include the one or more of the first plurality of computing devices with the level of resources dropping below the threshold level; and sending second instructions causing the second plurality of computing devices to deploy and execute service components allocated to each of the second plurality of computing devices to provide the information service.

11. The non-transitory computer-readable storage medium of claim 10, wherein automatically updating the allocation of the service components comprises:

applying at least one rule associated with the information service or a computing device of the second plurality of computing devices to determine the second plurality of computing devices and service components allocated to each of the second plurality of computing devices.

12. The non-transitory computer-readable storage medium of claim 11, wherein the at least one rule indicates a threshold latency between a client of the information service and one or more computing devices of the second plurality of computing devices that communicate with the client.

13. The non-transitory computer-readable storage medium of claim 11, wherein the at least one rule indicates a geographical region of at least a subset of the second plurality of computing devices.

14. A non-transitory computer-readable storage medium storing instructions for providing an information service in a network, the instructions when executed by a processor causing the processor to perform steps including:

determining allocation of service components of the information service to resources of a first plurality of computing devices that are hierarchically structured;

sending first instructions causing the first plurality of computing devices to deploy and execute service components allocated to the first plurality of computing devices to provide the information service;

detecting an update event after deploying the service components to the first plurality of computing devices according to the first instructions;

automatically updating the allocation of the service components to resources of a second plurality of computing devices that are hierarchically structured, responsive to detecting the update event; and sending second instructions causing the second plurality of computing devices to deploy and execute service components allocated to each of the second plurality of computing devices to provide the information service, wherein the first plurality of computing devices and the second plurality of computing devices each comprise:

a first level of computing devices operated by a cloud service provider;

a second level of computing devices lower in hierarchy than the first level of computing devices, the second level of computing devices operated by a telecommunication service provider separate from the cloud service provider; and a third level of computing devices lower in hierarchy than the second level of computing devices, each of the third level of computing devices communicating directly with at least one client.

15. The non-transitory computer-readable storage medium of claim 14, wherein at least one service component to service a client is deployed on a first computing device of the third level of computing devices that does not communicate directly with the client.

16. The non-transitory computer-readable storage medium of claim 14, wherein the first instructions and the second instructions are sent to a plurality of local orchestrators, each configured to deploy and execute the service components to computing devices in a level of the hierarchy.

* * * * *